Dec. 23, 1930. H. W. WATSON 1,785,797
MOLD
Filed June 9, 1928 2 Sheets-Sheet 1
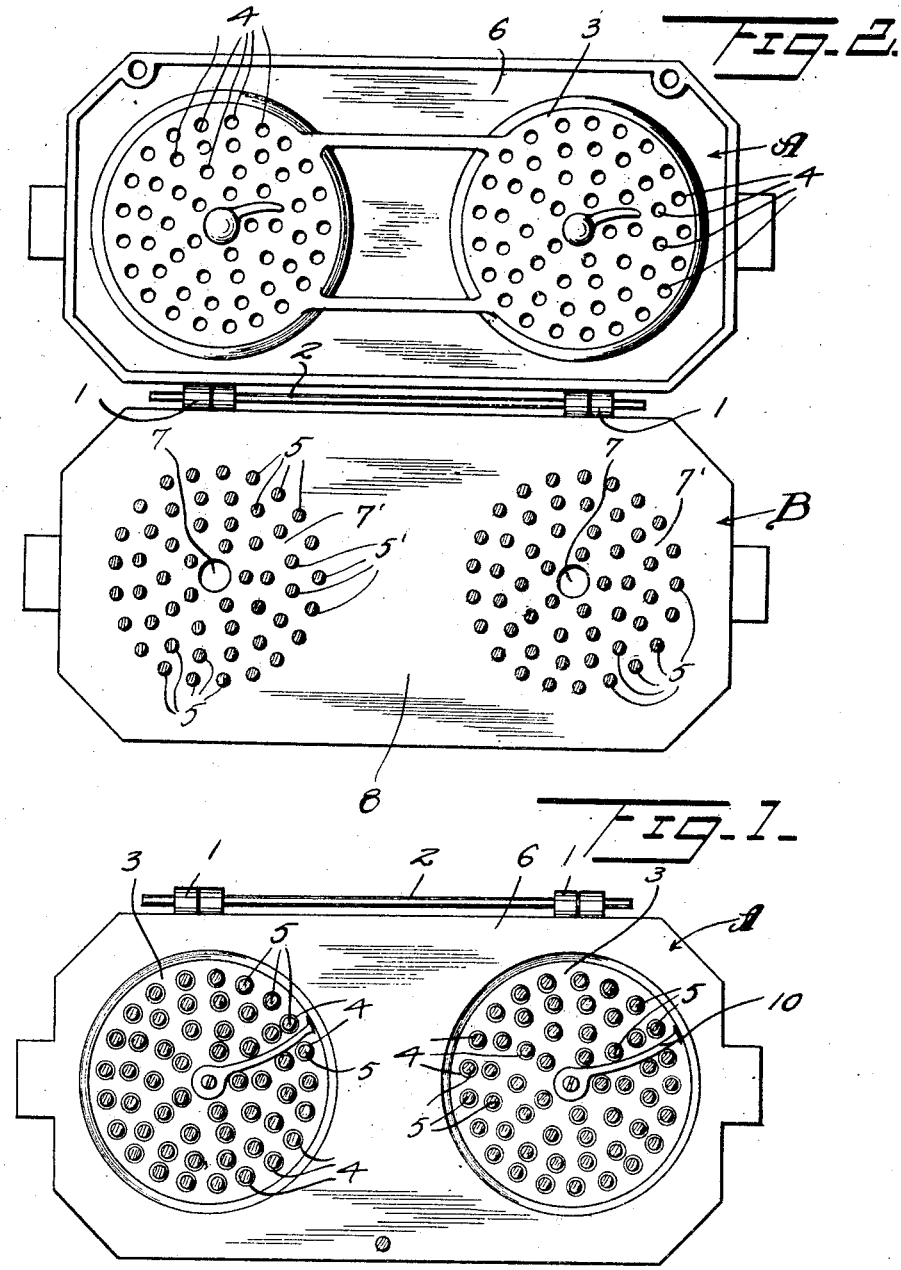
INVENTOR
BY H.W. Watson
Watson E. Coleman ATTORNEY Dec. 23, 1930.     H. W. WATSON     1,785,797
MOLD
Filed June 9, 1928     2 Sheets-Sheet 2

INVENTOR
BY H.W.Watson
Watson E. Coleman ATTORNEY

Patented Dec. 23, 1930

1,785,797

UNITED STATES PATENT OFFICE

HUGH W. WATSON, OF SEATTLE, WASHINGTON, ASSIGNOR, BY DIRECT AND MESNE ASSIGNMENTS, TO PERWATCO MANUFACTURING CO., OF CRETE, NEBRASKA, A CORPORATION OF NEBRASKA

MOLD

Application filed June 9, 1928. Serial No. 284,105.

This invention relates to molds and it is an object of the invention to provide a device of this kind especially designed and adapted for use in the forming of ground meat and the like into proper size cakes or patties preparatory to cooking the same.

Another object of the invention is to provide a device of this kind which operates to produce perforated cakes or patties to facilitate cooking as the resultant perforations in the cakes or patties allows the heat or hot grease to pass upwardly therethrough and thus materially quickening the cooking operation.

A further object of the invention is to provide a mold which assures a sanitary handling of the ground meat or kindred foodstuff and which is provided with means to facilitate the release of the cakes or patties from the mold whereby the formation of uniform size cakes or patties is assured.

The invention consists in the details of construction and in the combination and arrangement of the several parts of my improved mold whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in top plan showing a mold constructed in accordance with an embodiment of my invention and in adjustment prior to forming the desired patties or cakes;

Figure 2 is a view in plan showing the mold extended and in position to effect the discharge of the molded cakes or patties;

Figure 4:
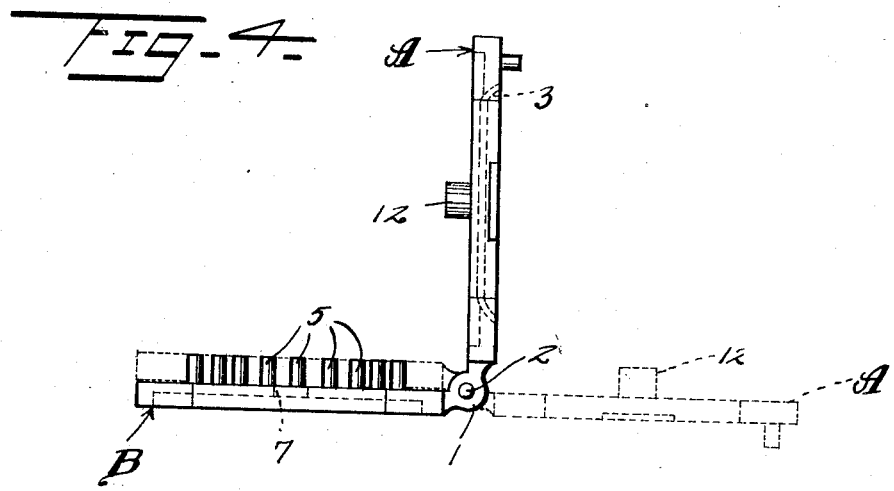
Figure 4 is a view in end elevation of the mold as herein disclosed and partly open, full open and full closed positions being indicated by broken lines.

As disclosed in the accompanying drawings, my improved mold comprises two sections A and B of desired dimensions and having adjacent longitudinal marginal portions provided with the outstanding and registering knuckles or sleeves 1 through which a pintle 2 is disposed whereby said sections are pivotally connected for relative swinging movement and in a manner whereby the section A may be superimposed upon the section B.

In practice, the section B comprises the lower section and the upper section A is provided with the depressions 3 of preferred dimensions and capacity and which constitute the dies in which the cakes or patties are to be formed.

The base wall of each of the depressions 3 has disposed therethrough a plurality of openings 4 through which are adapted to be projected the upstanding pins 5 carried by the bottom section B, said pins being of a length to terminate substantially flush with the upper surface of the main plate 6 of the section A when said section is folded or adjusted to overlie the section B. Each group of pins 5 are arranged in substantially annular series concentric to an opening 7 provided in the plate 8 of the section B with certain of said pins 5' arranged in a manner one with respect to the other to provide what may be termed a slot 7' to receive or accommodate an arm 9 carried by the bottom wall of each of the depressions 3 of the section A and underlying said bottom wall and also to receive a longitudinally curved knife 10 overlying the bottom wall of a depression 3.

The arm 9 and the knife 10 are carried by a bolt 11 disposed from above through the axial center of the bottom wall of a depression 3 and threaded or otherwise secured to the lower or opposite end portion of the bolt or headed shank 11 is an operating button or head 12. The arm 9 is disposed in the same direction as the knife 10 and when the section A is in full open position said arm 9 serves as an indicator to assure the proper positioning of the knife 10 at the opposite side of the section A so that when the section A is returned to its closed position upon the section B, it will be assured that the knif 10 will be properly received within the slot 7' hereinbefore referred to.

Figure 3:
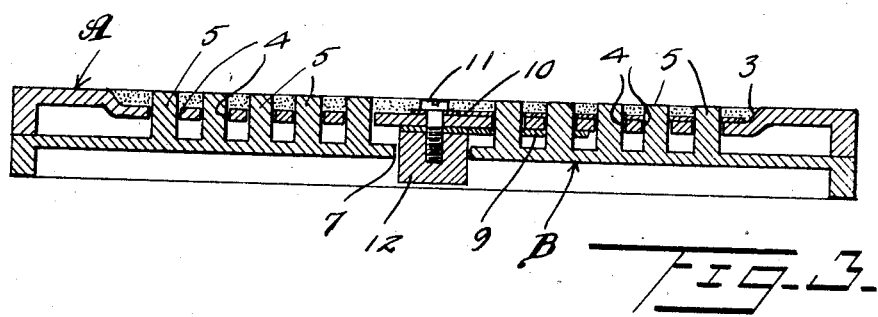
Figure 3 is an enlarged transverse sectional view taken through the assembly as illustrated in Figure 1.

When the sections A and B are in superimposed relation the button or headed shank 12 hereinbefore referred to will be disposed through an opening 7 as is particularly indicated in Figure 3.

In practice, suitably prepared hamburger steak or kindred chopped meat or foodstuff is placed within the depressions 3 when the section A is superimposed upon the section B, the resultant patties formed therein having disposed therethrough the upper end portions of the pins 5 so that when the patties or cakes are removed from the mold the same will have perforations therethrough to quicken the cooking operation as the heat or grease will readily pass up through said perforations in the cakes or patties when the same are upon a griddle or the like for cooking.

After the patties or cakes have been formed within the depressions 3, the section A is swung over into full open position and preferably upon a sheet of wax paper or the like and upon which the formed cakes or patties are adapted to be discharged. When the section A is in such full open position, a button or headed shank 12 may be readily turned to cause the associated knife 10 to pass around within a depression 3 to loosen the cake or patty formed therein and thereby facilitate its discharge. The sheet of wax paper or the like hereinbefore referred to may be also employed initially over the material as first applied within the depressions 3 and with which the operator directly contacts in forming the desired cakes or patties within the depressions, thus rendering the operation wholly sanitary.

From the foregoing description it is thought to be obvious that a mold constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A mold of the class described comprising two sections adapted to be disposed one over the other, one of said sections being provided with a molding recess, the bottom wall of said recess having openings therethrough, the second section having upstanding pins, said pins extending through the openings in the first section and through the molding recess when said sections are arranged one upon the other, a knife disposed over the bottom wall of the recess, means for rotating said knife, and means at the opposite side of the section movable with the knife to indicate the position of the knife.

2. A mold for forming and measuring perforated ground meat patties comprising two sections adapted to be disposed one over the other, one of said sections being provided with a molding and measuring recess upon its outer face when the sections are disposed one over the other, the wall of said recess having openings therethrough, the second section having upstanding pins, said pins extending through the openings in the first section and through the molding recess when said sections are arranged one upon the other, and means for loosening and ejecting the meat patties from their molding and measuring recess.

3. As a new article of manufacture, a molding device of the class described comprising two members adapted to be superimposed, the top member, when the members are superimposed, having in its upper face a molding recess, the bottom wall of the recess having perforations therethrough, the bottom member of said superimposed members having upstanding pins of a length to extend through the perforations and above the bottom wall of the top member, said members being hingedly connected one to the other to permit the same to be superimposed or to position the top member to one side of the lower member, the molding recess in the top member being downwardly disposed when said top member is swung to one side of the bottom member.

In testimony whereof I hereunto affix my signature.

HUGH W. WATSON.